(12) United States Patent
Jo

(10) Patent No.: US 6,297,861 B1
(45) Date of Patent: Oct. 2, 2001

(54) IMAGES ADJUSTING CIRCUIT OF DISPLAY MONITOR

(75) Inventor: Sang-soo Jo, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/059,185

(22) Filed: Apr. 14, 1998

(30) Foreign Application Priority Data

Apr. 14, 1997 (KR) .................................................. 97-13558

(51) Int. Cl.⁷ ............................... H04N 3/22; H04N 3/23
(52) U.S. Cl. ............................................. 348/806; 348/746
(58) Field of Search ................................. 348/806, 807, 348/745, 746, 747, 189, 190, 185, 177, 178; 345/127, 131; 315/371, 370; H04N 3/22, 3/23

(56) References Cited

U.S. PATENT DOCUMENTS 5,504,521 * 4/1996 Webb .................................. 348/180
5,856,729 * 1/1999 Tsai ................................... 315/370
5,896,170 * 4/1999 Webb .................................. 348/190

* cited by examiner

Primary Examiner—Sherrie Hsia
(74) Attorney, Agent, or Firm—Robert E. Bushnell

(57) ABSTRACT

An image adjusting circuit of a display monitor includes a microcomputer for storing an image adjusting data, converting it to a d-c level, and generating a PWM pulse; and an integrating circuit, receptive to the PWM pulse according to the image adjusting data generated from the microcomputer, for integrating the PWM pulse according to the period of a vertical retrace pulse, and applying an image adjusting pulse to a horizontal size regulating terminal, thereby compensates for the pin/barrel-shaped and trapezoid distortions on the display monitor by integrating the PWM pulse generated from the microcomputer to generate a waveform through one integrating circuit, and by adjusting the image by regulating the PWM pulse.

14 Claims, 7 Drawing Sheets

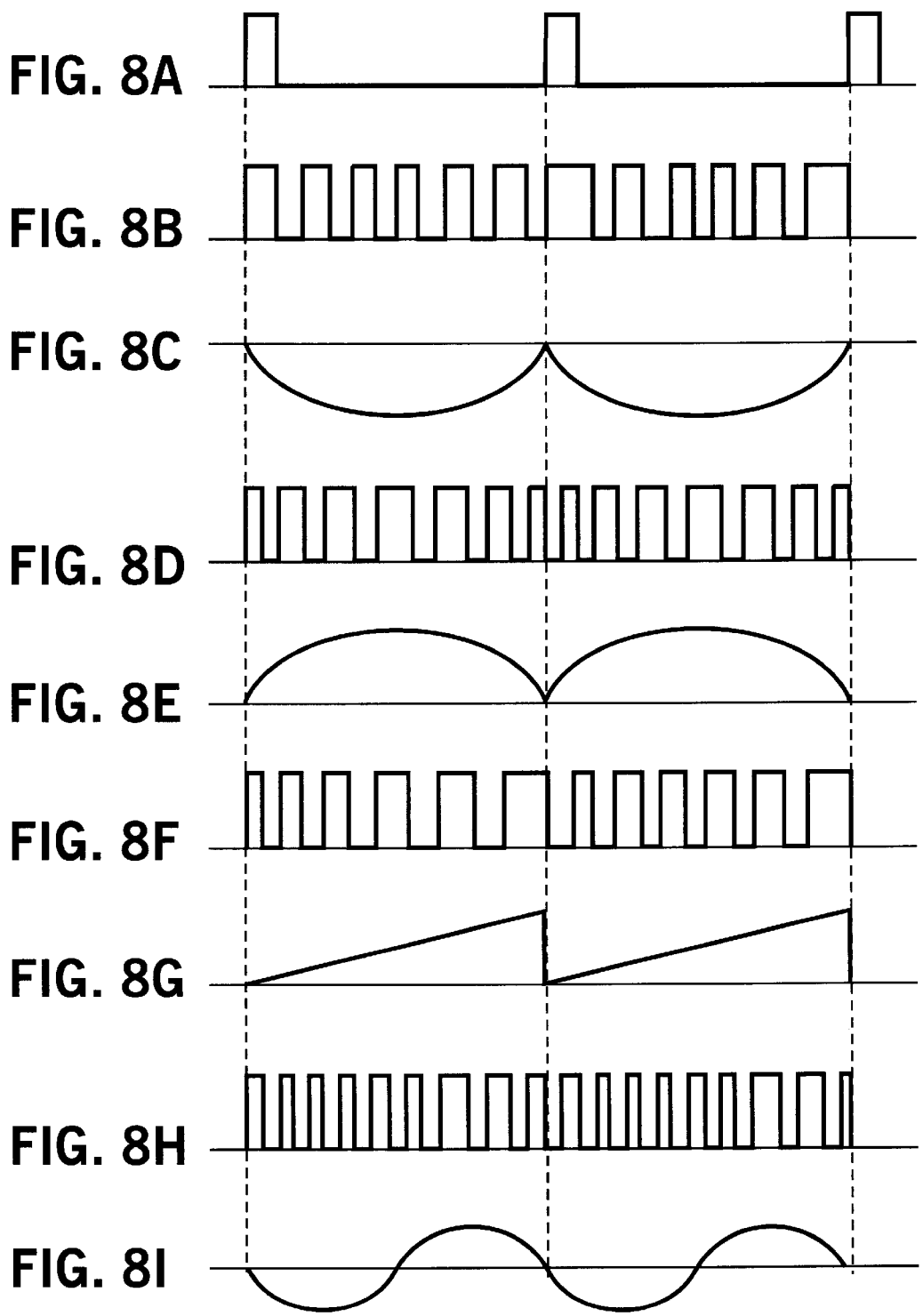

IMAGES ADJUSTING CIRCUIT OF DISPLAY MONITOR

BACKGROUND OF THE INVENTION

1. Field of the Invention

The present invention relates to an image adjusting circuit of a display monitor and, more particularly, to such an image adjusting circuit which is to compensate for pin/barrel-shaped and trapezoid image distortions by integrating the PWM signal generated from a microcomputer of the display monitor and applying the output waveform to a horizontal size adjusting circuit.

2. Discussion of Related Art

Conventionally, in a display monitor, an electron beam generated from a cathode and passing through a shadow mask strikes phosphors in response to the picture signals supplied from a computer, thereby emitting light to form a projected image on the screen of the display monitor. An example of such a display monitor is shown in FIG. 1.

In FIG. 1, a personal computer 100 is comprised of a CPU 110 for processing a keyboard signal and thereby generating output data, and a video card 120 for processing the data received from the CPU 110 into an RGB video signal and further generating horizontal and vertical sync signals which are to synchronize the RGB video signal.

Display monitor 200 receives the RGB video signal and the horizontal and vertical sync signals from the video card 120 in the computer 100. The display monitor 200 is comprised of a microcomputer 210 receptive to the horizontal and vertical sync signals, and discriminating a resolution; a control button section 220 for generating a screen control signal; a horizontal and vertical output circuit section 230 receptive to the screen control signal and a reference oscillating signal generated from the microcomputer 210, and synchronizing a raster; a video circuit section 240 for processing the RGB video signal received from the video card 120 through amplification and displaying them; and a power supplying circuit section 250 for supplying a driving power to the microcomputer 210, the horizontal and vertical output circuit section 230, and the video circuit section 240.

Following is a detailed description of the respective blocks in the display monitor 200 constructed as above.

Microcomputer 210 which stores all sorts of screen control data is receptive to the horizontal and vertical sync signals from the video card 120, and generates an image adjusting signal and a reference oscillating signal in response to the screen control signal applied from the control button section 220.

Receiving the image adjusting signal and the reference oscillating signal from the microcomputer 210, a horizontal and vertical oscillating signal processor 231 supplies a vertical pulse to a vertical drive circuit 232. The vertical pulse is to control the switching rate of a sawtooth wave generating circuit in response to the horizontal and vertical sync signals received from the video card 120.

As regards vertical drive circuit 232 receptive to the vertical pulse, most widely used are two types of them; one-stage vertical amplification type and emitter follower type. The emitter follower type vertical drive circuit has the base of the transistor therein used as an input with the emitter functioning as an output. Hence, the vertical drive circuit 232 normally performs an operation for the improvement of linear characteristic not of the gain.

The vertical drive circuit 232, after amplification, supplies a current signal to a vertical output circuit 233, which will generate a sawtooth current corresponding to the vertical synchronizing pulse flowing through a vertical deflection yoke (V-DY), determining a vertical scanning period in response to the sawtooth current. In addition, a horizontal drive circuit 234 receives a horizontal oscillating signal from the horizontal and vertical oscillating processor 231, and accordingly, provides a current sufficient to switch the horizontal output circuit 235. Horizontal drive circuit 234 is divided into two classes; in-phase type whose output is ON with the drive terminal ON, and out-of-phase type having the output if OFF with the drive terminal ON.

Upon receipt of the current from the horizontal drive circuit 234, the horizontal output circuit 235 will generate a sawtooth current to the horizontal deflection yoke (H-DY), determining a horizontal scanning period depending on the sawtooth current.

In order to supply a stable DC voltage to the anode of a cathode ray tube (CRT) 244, a high voltage is generated even with a weak collector voltage by use of the feedback collector via a fly-back transformed (FBT) 237 and the harmonic wave resulting from the leakage inductance and the distribution capacity of high-voltage circuit 236.

Thus generated high voltage is applied to the anode terminal 244a of the CRT 244, forming a high voltage across the anodic surface of the CRT 244 so as to adjust the luminance of the RGB picture signals which have been amplified in the video circuit section 240. Simultaneously, the video circuit section 240 has an OSD section 241 receiving an on-screen display (OSD) data generated during the screen control of the microcomputer 210 to generate an OSD gain signal.

This OSD gain signal from the OSD section 241 is sent to a video pre-amplifier 242 together with the RGB video signal from the video card 120. The video pre-amplifier 242 amplifies the RGB video signal to a limited voltage level via a low-voltage amplifier.

For example, a signal less than 1 $V_{PP}$ is subject to an amplification to the voltage of 4–6 $V_{PP}$ via the video pre-amplifier 242. This picture signal is further amplified to 40–60 $V_{PP}$ through a video main amplifier 243 and sent to the cathode of the CRT 244 for displaying an image.

The OSD signal is also amplified via the video pre-amplifier 242 and the video main amplifier 243 to display an OSD data on the screen of the CRT 244. This OSD data displayed on the screen provides the user with information relating to the display monitor 200.

Power supplying circuit section 250, which is to provide a driving voltage required for displaying the RGB picture signals on the screen of the display monitor, receives AC voltage through an AC input 251. The AC level is applied to a degaussing coil 252, which resumes the color blotted due to the influence of the earth magnetic field or external environment.

For this, degaussing coil 252 disperses the magnetic field formed across the shadow mask in CRT 244 in order to prevent the electron beams from being deflected unstably, while the AC voltage is applied to the degaussing coil 252 momentarily for 2–8 seconds.

The AC is normally rectified into a DC through a rectifier 253 and sent to a switching transformer 254. The switching transformer 254 supplies all sorts of driving voltage required in the monitor 200 through a voltage regulator 255. At this stage, where there is no vertical sync signal applied from the video card 120, the microcomputer 210 will send a suspend mode signal to a voltage regulator 255 to interrupt the deflecting voltage.

Pulse-width-modulation (PWM) section 256 controls the switching operation of the switching transformer 254, varying the conduction time through PWM so as to stabilize the output voltage of the transformer.

The microcomputer 210 sets up a power-off mode and a suspend mode depending on the presence of horizontal and vertical sync signals in order to save the power consumed in the display monitor 200.

Normally, such a conventional display monitor 200 as described above compensates an image distortion caused by the structure of the CRT 244. In displaying the RGB picture signals on the screen, CRT 244 has the cathode (not shown) generate thermoelectrons and deflects the electron beams in response to the horizontal and vertical sync signals H/V-SYNC.

Since the cathode is disposed in the center of the quadrilateral screen, however, thermoelectrons deflected towards the outer edge of the CRT 244 are projected to the inappropriate positions, which leads to an image distortion.

An embodiment of a conventional image adjusting circuit to compensate such an image distortion will be described below with reference to the attached drawing.

FIG. 2 is a circuit diagram illustrating an embodiment of the image adjusting circuit of the display monitor shown in FIG. 1. As shown in the figure, microcomputer (210 in FIG. 1) stores an image adjusting data in a built-in or external EEPROM (not shown). The image adjusting data stored in the EEPROM is to compensate image distortion generated in the trapezoid, pin-cushion or barrel form on the screen of the display monitor 200.

The image adjusting data is converted to an analog signal via a digital-to-analog converter, (not shown) and sent to integrating circuits. Out of the image adjusting data, a pin/barrel signal is applied to a first integrating circuit 1 consisting of a first operational amplifier OP1, a capacitor C2 and a first switch SW1.

The pin/barrel signal is matched via capacitor C1 and resistance R1 and applied to the negative (−) terminal of the first OP amplifier OP1 through the first switch SW1 and capacitor C2. The positive (+) terminal of the first OP amplifier OP1 receives a reference voltage divided from a DC voltage $V_{CC}$ via resistances R2 and R3.

Upon receipt of the pin/barrel signal and the reference voltage, the first integrating circuit 1 has the first switch SW1 open during a period of feedback vertical deflection when a vertical retrace pulse $V_{ret}$ is LOW. The pin/barrel signal is applied to the negative (−) terminal of the first OP amplifier OP1 via the capacitor C2.

The first OP amplifier OP1 generates the pin/barrel signal as a pin/barrel compensated waveform in response to the reference voltage divided via the resistances R2 and R3. The pin/barrel compensated waveform is subject to a decoupling through capacitor C3 and resistance R4 and applied to the negative (−) terminal of a second OP amplifier OP2.

Further, the positive (+) terminal of the second OP amplifier OP2 receives a reference voltage via resistances R2 and R3.

Upon receipt of the pin/barrel compensated waveform and the reference voltage from the first integrating circuit 1, the second integrating circuit 2 has a second switch SW2 open during a period when the vertical retrace pulse $V_{ret}$ is LOW. As the second switch SW2 is open, a trapezoid signal is generated from the microcomputer 210, converted to an analog signal through the digital-to-analog converter and supplied to the second integrating circuit 2.

In the second integrating circuit 2 which has received the trapezoid signal, the second switch SW2 is open while the vertical retrace pulse $V_{ret}$ is LOW. As the second switch SW2 is open, the trapezoid signal is matched through capacitor C4 and resistance R5 and supplied to the negative (−) terminal of the second OP amplifier OP2 according to the charge/discharge of capacitor C5.

Normally, the pin/barrel compensated waveform applied from the first integrated circuit 1 and the trapezoid signal supplied via capacitor C6 are overlapped with each other and applied to the second OP amplifier OP2. The second OP amplifier OP2 which has received the overlapped waveforms and the reference voltage integrates the waveforms according to the charge/discharge of capacitor C5, thereby generating an image adjusting compensated wave through resistance R6 and capacitor C6.

The image adjusting compensated wave is applied to a horizontal size regulating circuit (not shown) and the horizontal output circuit (235 in FIG. 1) for the control of the horizontal deflection. Finally, the pin/barrel and trapezoid distortions in the display monitor 200 are compensated through such a control of the horizontal deflection.

The output waveforms of the conventional image adjusting circuit will be described as follows with reference to FIGS. 3–5.

FIGS. 3A–3E illustrate the waveforms generated from each output terminal of the image adjusting circuit shown in FIG. 2, and FIGS. 4 and 5 illustrate the pin/barrel-shaped and trapezoid distortions in the display monitor. The vertical retrace pulse (FIG. 3A) occurs during a vertical deflection. The barrel (FIG. 3B) and pin (FIG. 3C) pulses are applied to a horizontal size regulating circuit (not shown) so as to compensate the pin-cushion and barrel image distortion as shown in FIG. 4.

As seen from the display monitor in FIG. 4, the dotted lines 2 and 2' indicate the pin-cushion image distortion, i.e., a concavo-concave image distorted from a normal one as indicated by the solid lines 3 and 3'. To compensate for the pin-shaped distortion and drive a horizontal deflection of the distortion-compensated image, the waveform (C) generated from the first integrating circuit 1 is processed through the horizontal size regulating circuit, the horizontal output circuit 236 and the horizontal deflection yoke.

The waveform (B) is applied to the horizontal output circuit (235 in FIG. 1) and the horizontal deflection yoke (H-DY in FIG. 1) in order to compensate for the barrel-shaped distortion as indicated by the convexo-convex dotted lines 1 and 1' in displaying the normal image as represented by the solid lines 3 and 3'.

The trapezoid distortion, as shown in FIG. 5, is indicated by dotted lines 4 and 4', and 5 and 5' that are inclined inward and outward from the solid lines 3 and 3' representing the normal image. To compensate for the trapezoid distortion and drive a compensated vertical deflection, the second integrating circuit (2 in FIG. 2) which has received the trapezoid signal from the microcomputer (210 in FIG. 1) outputs the waveform (D).

The waveform (D) is used to compensate for the trapezoid distortion into the normal image. Further, the waveform (E) is to compensate for only the trapezoid distortion and drive the horizontal deflection through compensated through the horizontal output circuit 235 and the horizontal deflection yoke H-DY.

However, the conventional image adjusting circuit for compensating for the pin/barrel-shaped and trapezoid distortion requires a separate digital-to-analog converter for converting the image adjusting data stored in the microcomputer to an analog DC level, increasing the complexity of the circuit construction, so that it has a limitation in generating the output waveforms through an integration of only the d-c level, with a consequence of deterioration of the efficiency in compensating for the pin/barrel-shaped and trapezoid image distortions.

SUMMARY OF THE INVENTION

Accordingly, an object of the present invention is to provide an image adjusting circuit which is to compensate for pin/barrel-shaped and trapezoid distortions of a display monitor by use of one integrating circuit for converting a DC to a PWM pulse and integrating the PWM.

To achieve these and other advantages and in accordance with the purpose of the present invention, as embodied and broadly described, there is provided an image adjusting circuit of a display device, comprising a microcomputer, having an internal memory device and a horizontal size regulating terminal, for generating a pulse-width-modulated (PWM) pulse corresponding to image adjusting data stored in the internal memory device and for converting the PWM pulse into a DC voltage; and an integrating circuit for integrating the generated PWM pulse according to the period of a vertical retrace pulse and for applying the image adjusting pulse to the horizontal size regulating terminal, thereby compensating for an image distortion of the display monitor.

BRIEF DESCRIPTION OF THE ATTACHED DRAWINGS

FIGS. 8A–8I waveform diagrams illustrating the waveform generated from the image adjusting circuit shown in FIG. 6.

DETAILED DESCRIPTION OF THE PREFERRED EMBODIMENT

Figure 1:
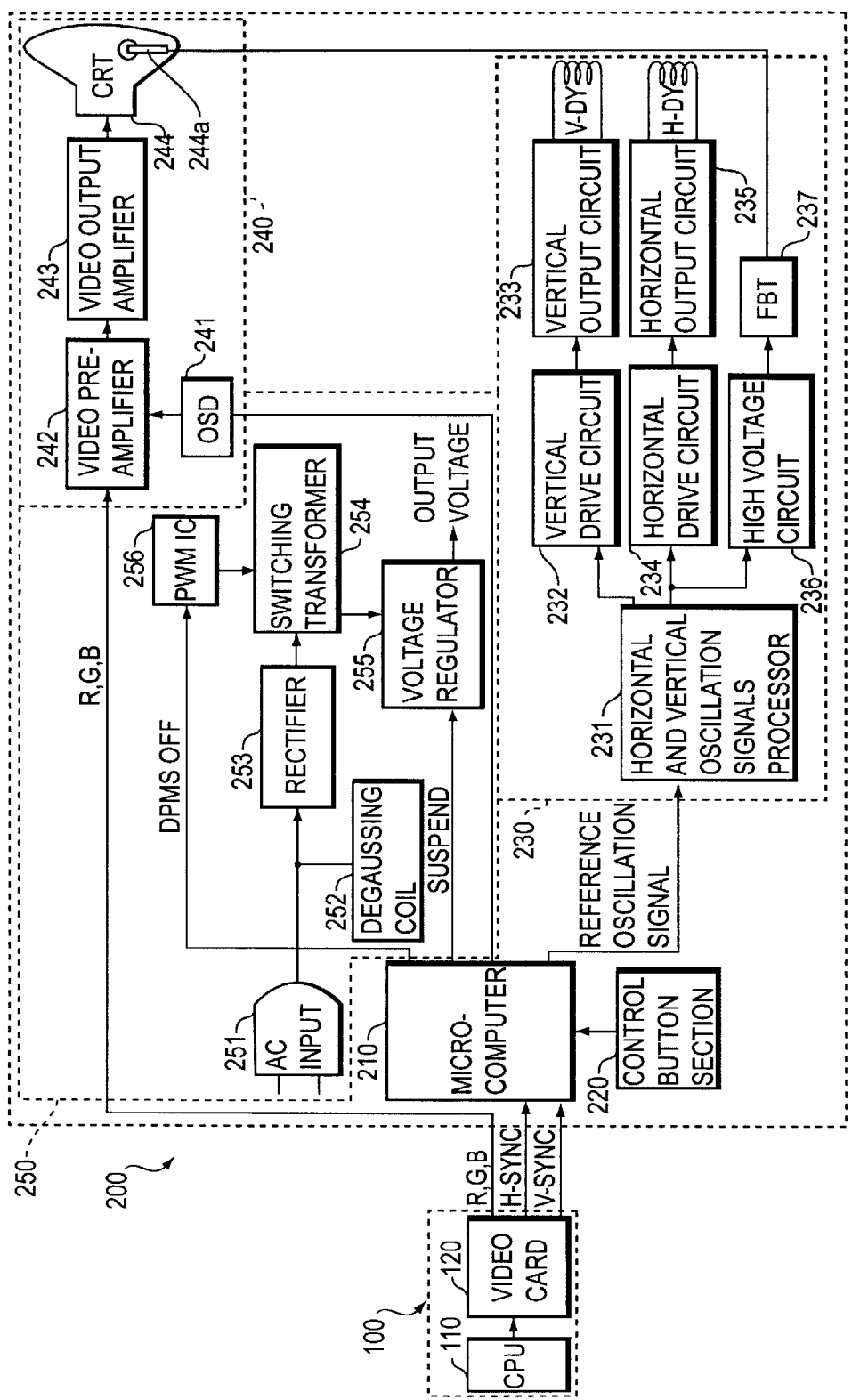
FIG. 1 is a block diagram of the internal circuit of a conventional display monitor.
Figure 2:
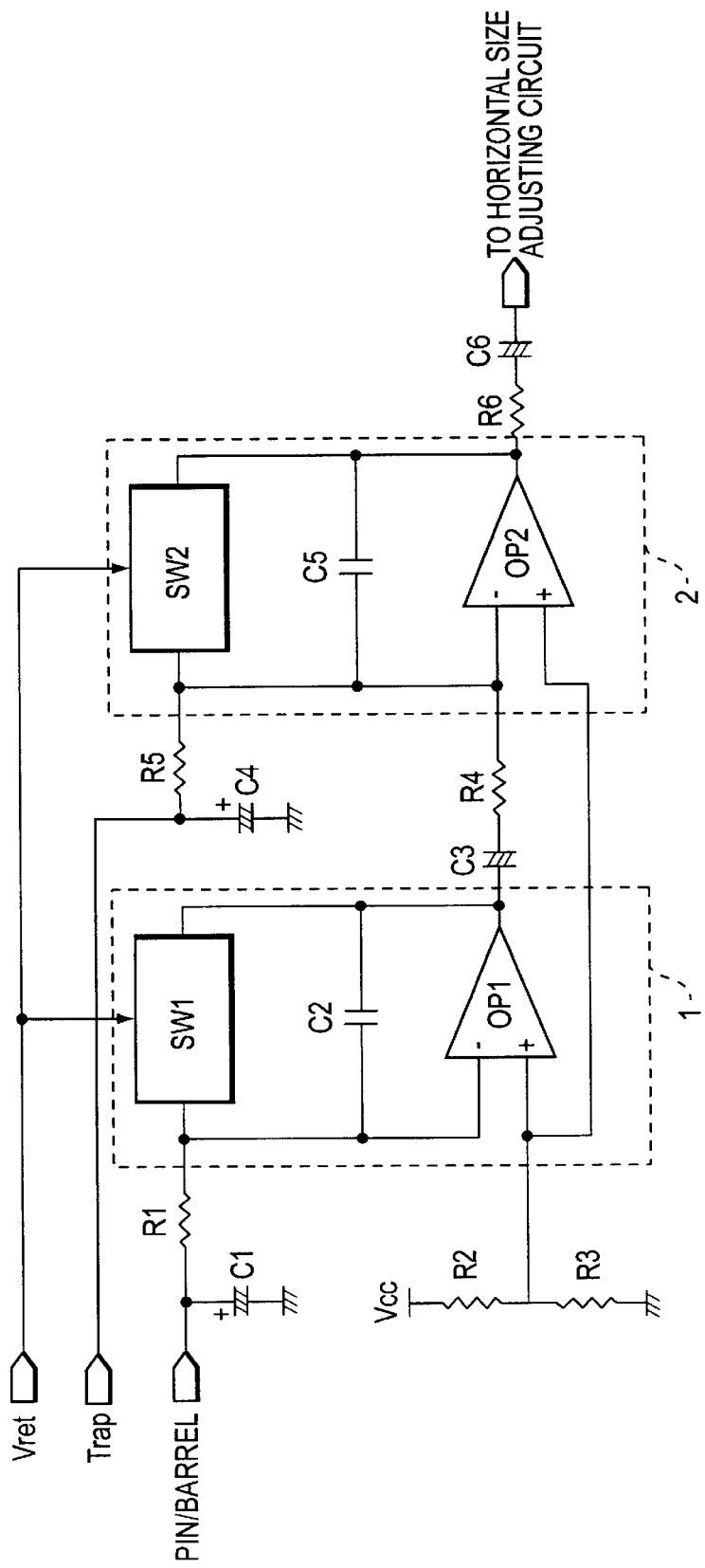
FIG. 2 is a circuit diagram illustrating an embodiment of an image adjusting circuit of the display monitor shown in FIG. 1.
Figure 3:
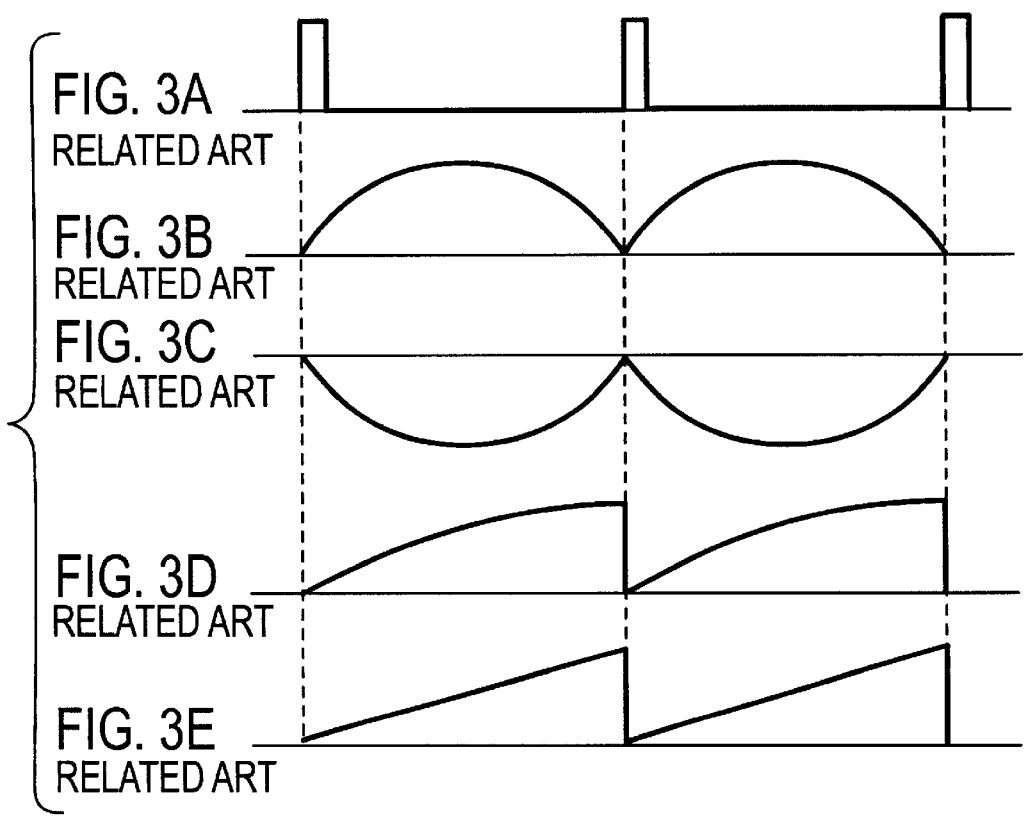
FIGS. 3A–3E are waveform diagrams showing the outputs of the image adjusting circuit shown in FIG. 2.
Figure 4:
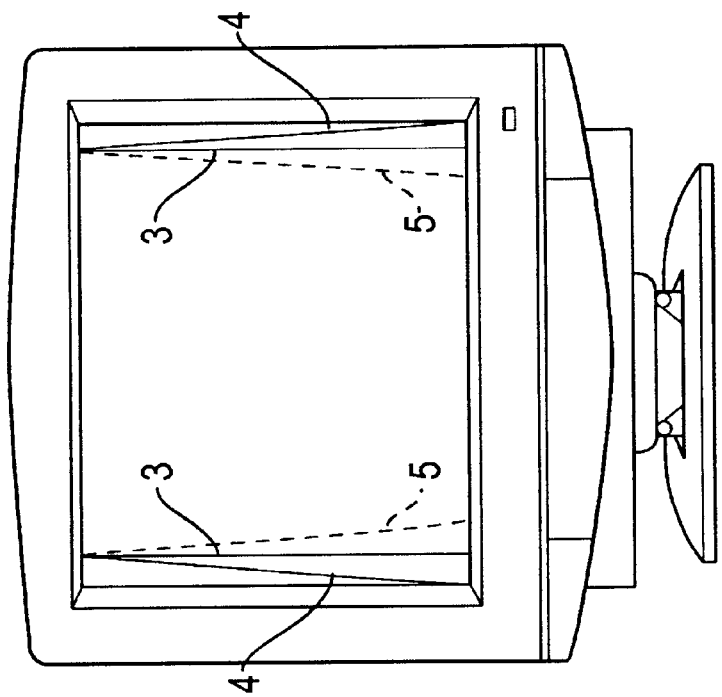
FIG. 4 illustrates pin/barrel distortions in the display monitor.
Figure 5:
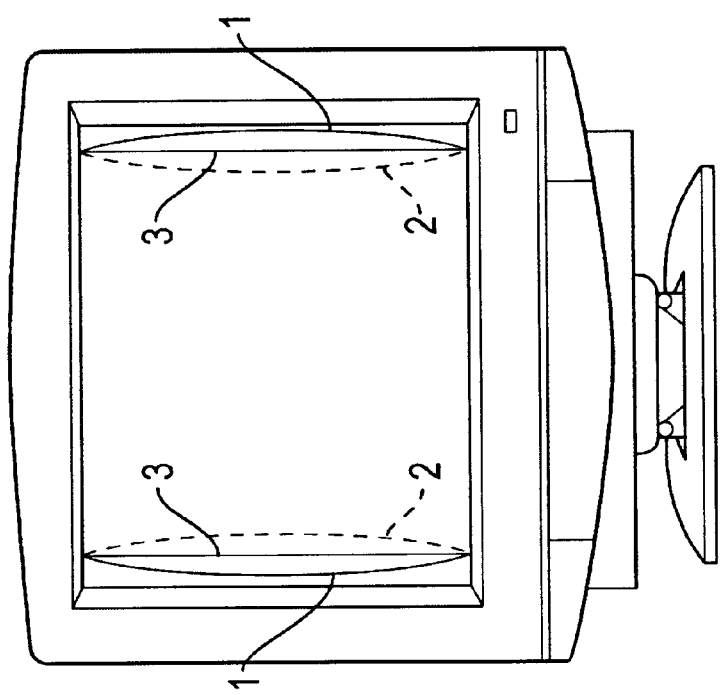
FIG. 5 illustrates a trapezoid distortion in the display monitor.
Figure 6:
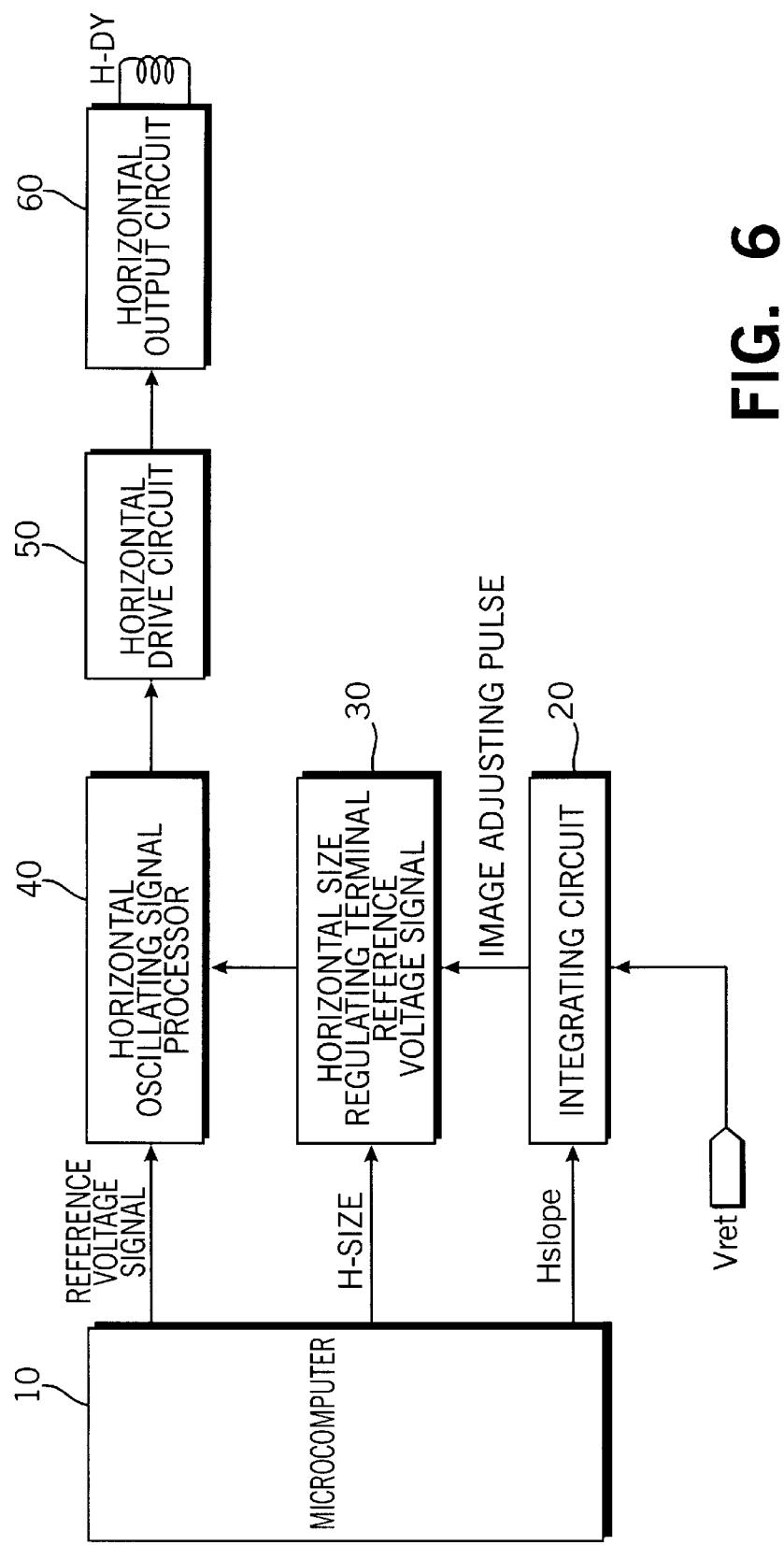
FIG. 6 is a block diagram of an image adjusting circuit of a display monitor in accordance with the present invention.

FIG. 6 is a block diagram of an image adjusting circuit of a display monitor in accordance with the present invention.

In FIG. 6, the image adjusting circuit is comprised of: a microcomputer 10 for discriminating the resolution of picture signals generated from a host computer (not shown), storing all sorts of image adjusting data, converting the image adjusting data to a DC level, and generating a PWM pulse; an integrating circuit 20 for integrating the PWM pulse received from the microcomputer 10 according to the period of a vertical retrace pulse $V_{ret}$ to generate an image adjusting pulse; a horizontal size regulating terminal 30 receiving a horizontal size (H-SIZE) signal generated from the microcomputer 10, and generating a horizontal size regulating signal according to the image adjusting pulse received from the integrating circuit 20; a horizontal oscillating signal processor 40 receiving a reference oscillating signal from the microcomputer 10 and the image-compensated horizontal size regulating signal from the horizontal size regulating terminal 30, and generating a horizontal oscillating signal; a horizontal drive circuit 50 for supplying a current sufficient to switch a horizontal output circuit 60 according to a horizontal oscillating signal received from the horizontal oscillating signal processor 40; and a horizontal deflection yoke H-DY receiving the current generated from the horizontal output circuit 60 to generate a horizontal sawtooth wave current.

The image adjusting circuit of such a construction is operated as follows.

The host computer generates an image data to be processed as picture signals, and also horizontal and vertical sync signals to synchronize the picture signals. These picture signals are subject to an amplification through a video circuit (not shown) in displaying an image.

Microcomputer 10 receives the horizontal and vertical sync signals, discriminates the resolution of picture signals, and generates a signal for adjusting the image displayed via a CRT. It also generates all sorts of PWM pulse in compensating for pin/barrel-shaped and trapezoid distortions of the image displayed. The PWM pulse is a waveform generated in a manner that the image adjusting data stored in the EEPROM (not shown) provided inside or outside the microcomputer 10 is converted to a DC level.

The PWM pulse is generated with its pulse width modulated depending on the type of image distortion to be compensated for, i.e., pin/barrel-shaped or trapezoid distortion. Thus generated PWM pulse is applied to the integrating circuit 20.

Once receiving the PWM pulse according to the image adjusting signal, the integrating circuit 20 receives a vertical retrace pulse $V_{ret}$, integrating the PWM pulse during a period when the vertical retrace pulse $V_{ret}$ is LOW, generating an image adjusting pulse.

Horizontal size regulating terminal 30 receives the image adjusting pulse generated from the integrating circuit 20 as well as a horizontal size signal from the microcomputer 10, to generate a horizontal size regulating signal.

For example, if the microcomputer 10 generates a PWM pulse with a pulse width to compensate for the pin-shaped distortion, the integrating circuit 20 will integrate the PWM pulse while the vertical retrace pulse is LOW, and generate an image adjusting pulse.

The image adjusting pulse to compensate for the pin-shaped distortion is applied to horizontal size regulating terminal 30, which also receives a horizontal size signal generated from the microcomputer 10, generating a horizontal size regulating signal. The horizontal size regulating signal is then sent to horizontal oscillating signal processor 40.

The horizontal oscillating signal processor 40 further receives a reference oscillating signal from the microcomputer 10 so as to generate an oscillating signal in response to the horizontal size regulating signal. Thus generated oscillating signal is applied to horizontal drive circuit 50 to generate a current sufficient to switch horizontal output circuit 60, which will send a horizontal sawtooth wave current to horizontal deflection yoke H-DY.

The horizontal sawtooth current sent from the horizontal deflection yoke H-DY is used to compensate for the pin-shaped distortion of the CRT in displaying the picture signals generated from the host computer. The barrel-shaped and trapezoid distortions are also compensated in analogous to the pin-shaped distortion.

The image adjusting circuit will be described in more detail as follows with reference to the attached drawings.

Figure 7:
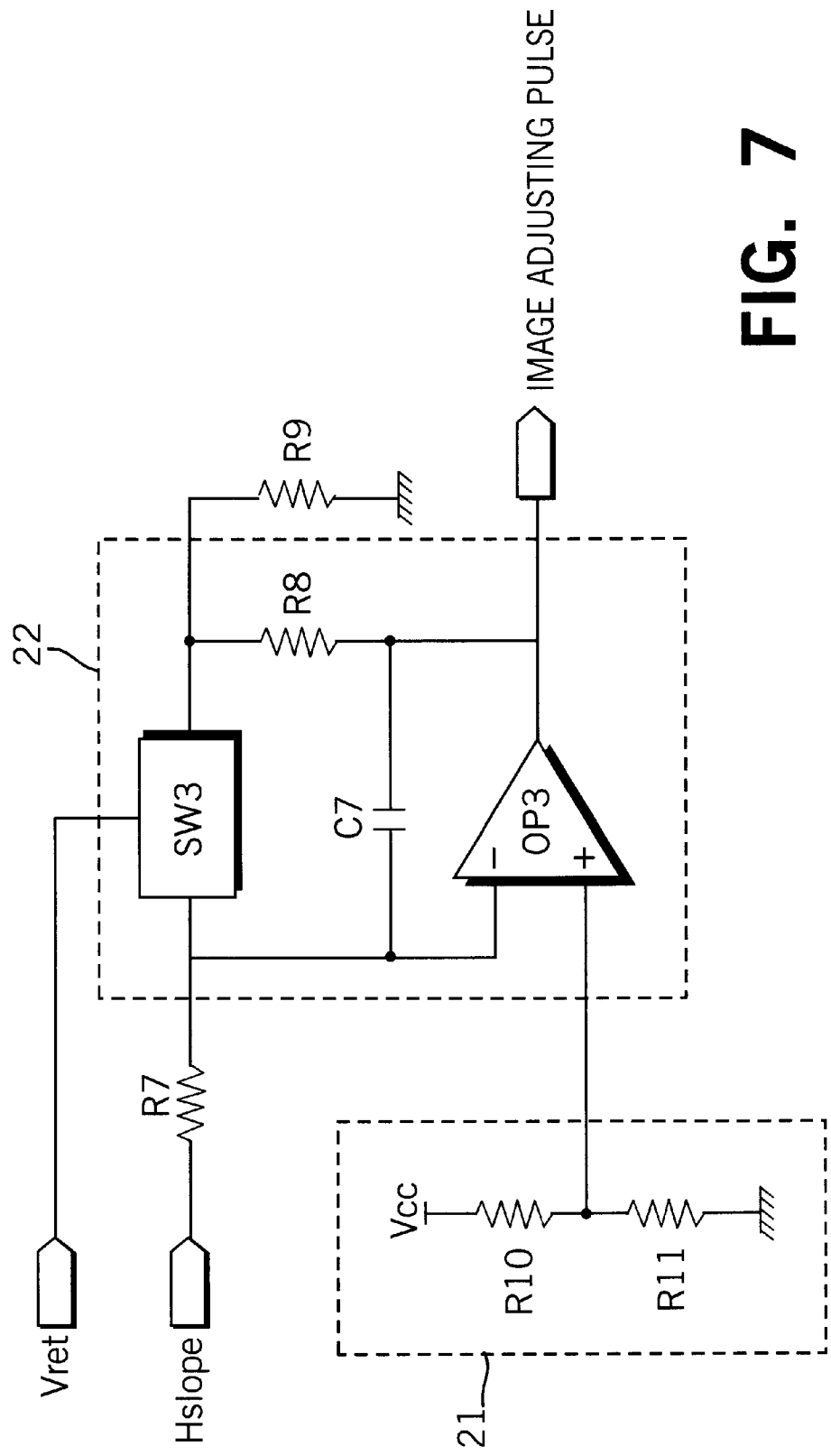
FIG. 7 is a circuit diagram illustrating an embodiment of the integrator shown in FIG. 6.

FIG. 7 is a circuit diagram of the integrator shown in FIG. 6. In FIG. 7, the integrating circuit (20 in FIG. 6) is composed of: a reference voltage section 21 dividing a DC voltage $V_{CC}$ through resistances R10 and R11, generating a reference voltage; and an integrator 22 receiving the reference voltage from the reference voltage section 21 as well as a PWM pulse and a vertical retrace pulse $V_{ret}$ from the microcomputer (10 in FIG. 6), and integrating the PWM pulse according to the period of the vertical retrace pulse $V_{ret}$, thereby generating an image adjusting pulse.

The integrator 22 is composed of: a third switch SW3 switched in response to the vertical retrace pulse $V_{ret}$; a third OP amplifier OP3 receiving the PWM pulse from the microcomputer 10 at the negative (−) terminal and the reference voltage from the reference voltage section 21 at the positive (+) terminal; plural resistances R8 and R9; and a capacitor C7.

The operation of the integrator 22 will be described as follows with reference to FIGS. 8A–8I.

The image adjusting circuit 20 forces the electron beams to scan one line in the horizontal direction and then moves them to the next line for a subsequent horizontal scanning. The pulse for synchronizing the vertical deflecting operation in moving the electron beams from one horizontal line to another one is referred to as "vertical retrace pulse $V_{ret}$", which is shown as a waveform in FIG. 8A. This vertical retrace pulse $V_{ret}$ is applied to the third switch SW3, an analog switch of the integrator 22.

The positive (+) terminal of the third OP amplifier OP3 in the integrator 22 receives the reference voltage supplied from the reference voltage section 21. Upon receiving the vertical retrace pulse $V_{ret}$ and the reference voltage, the integrator 22 integrates the PWM pulse generated from the microcomputer 10, sending an image adjusting pulse to the horizontal size regulating terminal (30 in FIG. 6).

More concretely, the waveform in FIG. 8B is the PWM pulse to compensate for the pin-shaped distortion, which is applied to the negative (−) terminal of the third OP amplifier OP3 via resistance R7.

Upon receipt of the waveform in FIG. 8B, the integrator 22 has the third switch SW3 receiving the vertical retrace pulse $V_{ret}$. The third switch SW3 is open during a period when the vertical retrace pulse $V_{ret}$ is LOW.

While the vertical retrace pulse $V_{ret}$ is HIGH, the third switch SW3 performs a vertical feedback deflecting operation and is short-circuited, with the PWM pulse grounded via resistance R9, thereby suspending the vertical deflecting operation.

Once the third switch SW3 is open with the vertical retrace pulse $V_{ret}$ HIGH, the PWM pulse is charged/discharged according to the time constants of capacitor C7 and resistance R8, and applied to the negative (−) terminal of the third OP amplifier OP3.

The third OP amplifier OP3 integrates the waveform in FIG. 8B, PWM pulse to compensate for the pin-shaped distortion, sending the image adjusting pulse, that is, waveform in FIG. 8C to the horizontal size regulating terminal 30.

The waveform in FIG. 8B is the PWM pulse to compensate for the barrel-shaped distortion, which is applied to the negative (−) terminal of the third OP amplifier OP3 of the integrator 22.

Once the waveform in FIG. 8D is sent to the negative (−) terminal of the third switch SW3, it is charged/discharged according to the time constants of capacitor C7 and resistance R8 during a period when the vertical retrace pulse $V_{ret}$ is LOW, and integrated through the integrator 22. The integrator 22 then sends an image adjusting pulse, that is, waveform in FIG. 8E to the horizontal size regulating terminal 30.

The waveform in FIG. 8F is the PWM pulse to compensate for the trapezoid distortion, which is applied to the negative (−) terminal of the third OP amplifier OP3 of the integrator 22.

The waveform (D) applied to the negative (−) terminal of the third OP amplifier OP3 is charged/discharged according to the time constants of capacitor C7 and resistance R8 during a period when the vertical retrace pulse $V_{ret}$ is LOW, and integrated through the integrator 22. The integrator 22 then sends an image adjusting pulse, that is, waveform in FIG. 8G to the horizontal size regulating terminal 30.

The waveform in FIG. 8F which is the PWM pulse to balance the image displayed through the CRT is applied to the negative (−) terminal of the third OP amplifier OP3 of the integrator 22.

The waveform in FIG. 8H is the PWM pulse applied to the negative (−) terminal of the third OP amplifier OP3 in order to compensate for the balance form distortion. It is also charged/discharged according to the time constants of capacitor C7 and resistance R8 during a period when the vertical retrace pulse $V_{ret}$ is LOW, and integrated through the integrator 22. The integrator 22 accordingly sends an image adjusting pulse, that is, waveform in FIG. 8I to the horizontal size regulating terminal 30.

To sum up, the horizontal size regulating terminal 30 receives the waveforms FIGS. 8C, 8E, 8G and 8I depending on the image adjusting pulses generated from the integrator 22 of the image adjusting circuit 20, sending them to the horizontal oscillating signal processor 40. Then, the horizontal oscillating signal processor 40 generates a horizontal oscillating signal in response to an image size regulating signal.

The image size regulating signal is sent to the horizontal drive circuit 50, which generates a current sufficient to switch the horizontal output circuit 60 in response to the horizontal oscillating signal. The horizontal output circuit 60 generates a horizontal sawtooth wave current to the horizontal deflection yoke H-DY. Accordingly, only one integrating circuit can be used in compensating for the distortion of an image displayed through the CRT according to the horizontal sawtooth wave current.

As described above, the present invention compensates for the pin/barrel-shaped and trapezoid distortion on the display monitor by integrating the PWM pulses generated from the microcomputer to generate a waveform through one integrating circuit, and further adjusts the image by regulating the PWM pulses.

It will be apparent to those skilled in the art that various modifications can be made in the image adjusting circuit of a display monitor according to the present invention, without departing from the spirit of the invention. Thus, it is intended that the present invention cover such modifications as well as variations thereof, within the scope of the appended claims and their equivalents.

What is claimed is:

1. An image adjusting circuit of a display device, said circuit comprising:
 a microcomputer, having an internal memory device and a horizontal size regulating terminal, for generating a pulse-width modulated (PWM) pulse corresponding to image adjusting data stored in the internal memory device and for converting the PWM pulse into a DC voltage; and an integrating circuit for integrating the generated PWM pulse according to the period of a vertical retrace pulse and for applying an image adjusting pulse to the horizontal size regulating terminal, thereby compensating for an image distortion of the display device.

2. The image adjusting circuit of claim 1, wherein said integrating circuit comprises:

a reference voltage section for generating a reference voltage using a power supply source; and an integrator for integrating the PWM pulse output from said microcomputer according to the period of the vertical retrace pulse of the display device and thereby generating the image adjusting pulse with respect to the reference voltage.

3. The image adjusting circuit of claim 2, wherein said integrator comprises:

a switching means operating according to the vertical retrace pules; and an operational amplifier receiving the PWM pulse from said microcomputer at an inverting input thereof and the reference voltage from the reference voltage section at a non-inverting input thereof.

4. The image adjusting circuit of claim 3, wherein said switching means comprises an analog switch.

5. A method of adjusting an image of a display device, said method comprising the steps of:

(1) generating a pulse-width-modulated (PWM) pulse corresponding to image adjusting data stored in an internal memory device of a microcomputer;

(2) converting the PWM pulse to a DC voltage;

(3) integrating the generated PWM pulse according to the period of a vertical retrace pulse, whereby an image adjusting pulse is provided; and (4) applying the image adjusting pulse to a horizontal size regulating terminal of the microcomputer to compensate for an image distortion of the display device, whereby a horizontal size regulator signal is provided.

6. The method of claim 5, wherein the step of integrating the generated PWM pulse is carried out in an integrator circuit that comprises:

a reference voltage section for generating a reference voltage using a power supply source; and an integrator for integrating the PWM pulse output from said microcomputer according to the period of the vertical retrace pulse of the display device and thereby generating the image adjusting pulse with respect to the reference voltage.

7. The method of claim 6, wherein the integrator circuit further comprises:

a switching means operating according to the vertical retrace pulse; and an operational amplifier receiving the PWM pulse from said microcomputer at an inverting input thereof and the reference voltage from the reference voltage section at a non-inverting input thereof.

8. The method of claim 7, wherein the switching means comprises an analog switch.

9. The method of claim 5, wherein the horizontal size regulator signal is fed to a circuit for reducing pin/barrel-shaped image distortions.

10. The method of claim 5, wherein the horizontal size regulator signal is fed to a circuit for reducing trapezoid image distortions.

11. A method of adjusting an image of a display device, said method comprising the steps of:

(1) a step for generating a signal for reducing image distortions, without utilizing a digital-to-analog converter for converting image adjusting digital signals to analog DC signals; and (2) feeding said signal for reducing image distortions to a circuit for adjusting pin/barrel-shaped or trapezoid image distortions in a CRT.

12. A method of adjusting an image of a display device, said method comprising the steps of:

(1) generating a signal for reducing image distortions, said signal generated in a circuit comprising:

a microcomputer, having an internal memory device and a horizontal size regulating terminal, for generating a pulse-width-modulated (PWM) pulse corresponding to image adjusting data stored in the internal memory device and for converting the PWM pulse into a DC voltage; and an integrating circuit for integrating the generated PWM pulse according to the period of a vertical retrace pulse and for applying an image adjusting pulse to the horizontal size regulating terminal, thereby compensating for an image distortion of the display device; and (2) feeding said signal for reducing image distortions to a circuit for adjusting pin/barrel-shaped or trapezoid image distortions in a CRT.

13. The method of claim 12, wherein said integrating circuit comprises:

a reference voltage section for generating a reference voltage using a power supply source; and an integrator for integrating the PWM pulse output from said microcontroller according to the period of the vertical retrace pulse of the display device and thereby generating the image adjusting pulse with respect to the reference voltage.

14. The method of claim 13, wherein said integrator comprises:

a switching means operating according to the vertical retrace pulse; and an operational amplifier receiving the PWM pulse from said microcomputer at an inverting input thereof and the reference voltage from the reference voltage section at a non-inverting input thereof.

* * * * *